(12) United States Patent
Straker

(10) Patent No.: US 11,327,341 B2
(45) Date of Patent: May 10, 2022

(54) TORIC CONTACT LENS STABILIZATION DESIGN BASED ON THICKNESS GRADIENTS ORTHOGONAL TO EYELID MARGIN

(71) Applicant: Johnson & Johnson Vision Care, Inc., Jacksonville, FL (US)

(72) Inventor: Benjamin Straker, Jacksonville, FL (US)

(73) Assignee: Johnson & Johnson Vision Care, Inc, Jacksonville, FL (US)

( * ) Notice: Subject to any disclaimer, the term of this patent is extended or adjusted under 35 U.S.C. 154(b) by 172 days.

(21) Appl. No.: 16/441,314

(22) Filed: Jun. 14, 2019

(65) Prior Publication Data
US 2020/0393700 A1  Dec. 17, 2020

(51) Int. Cl.
G02C 7/04 (2006.01)
G02C 7/02 (2006.01)

(52) U.S. Cl.
CPC ............ *G02C 7/048* (2013.01); *G02C 7/027* (2013.01); *G02C 7/028* (2013.01); *G02C 7/04* (2013.01)

(58) Field of Classification Search
CPC ........ G02C 7/027; G02C 7/048; G02C 7/024; G02C 7/028; G02C 7/04; G02C 7/043
USPC ............ 351/159.02, 159.19, 159.67, 159.73
See application file for complete search history.

(56) References Cited

U.S. PATENT DOCUMENTS

| | | | | |
|---|---|---|---|---|
| 6,109,749 A | * | 8/2000 | Bernstein | G02C 7/043 351/159.41 |
| 2004/0017542 A1 | * | 1/2004 | Lindacher | G02C 7/048 351/159.1 |
| 2008/0097600 A1 | * | 4/2008 | Hare | G02C 7/081 623/6.37 |
| 2009/0225273 A1 | | 9/2009 | Chutterbuck | |
| 2011/0149231 A1 | | 6/2011 | Gerligand et al. | |
| 2013/0077045 A1 | * | 3/2013 | Gerligand | G02C 7/048 351/159.74 |
| 2016/0131924 A1 | * | 5/2016 | Thompson | G02C 7/04 351/159.02 |
| 2017/0139231 A1 | * | 5/2017 | Gerligand | G02C 7/028 |
| 2018/0088351 A1 | * | 3/2018 | Kennedy | B29D 11/00817 |
| 2018/0113324 A1 | | 4/2018 | Gerligand et al. | |
| 2019/0142577 A1 | | 5/2019 | Xie | |

* cited by examiner

Primary Examiner — Jordan M Schwartz

(57) ABSTRACT

Ophthalmic lenses are described herein. An example ophthalmic lens may comprise a first surface. The example ophthalmic lens may comprise a second surface disposed opposite the first surface and defining a volume of lens material therebetween. A thickness profile of the volume of lens material may be derived from one or more eyelid profiles such that a thickness gradient of the volume of lens material is oriented to be substantially orthogonal to a target eyelid margin shape.

23 Claims, 13 Drawing Sheets

TORIC CONTACT LENS STABILIZATION DESIGN BASED ON THICKNESS GRADIENTS ORTHOGONAL TO EYELID MARGIN

BACKGROUND

A wearer may wear a contact lens on an eye to improve sight. Performance of a type of contact lens may vary from wearer to wearer. The type of contact lens may move more within an eye of a first wearer during use and move less within an eye of a second wearer during use. The type of contact lens may lack consistency in a settled position across wearers. Thus, there is a need for improvements in performance of contact lenses and improvements in consistency of performance of contact lenses across wearers.

SUMMARY

Ophthalmic lenses are described herein. An example ophthalmic lens may comprise a first surface. The example ophthalmic lens may comprise a second surface disposed opposite the first surface and defining a volume of lens material therebetween. A thickness profile of the volume of lens material may be derived from one or more eyelid profiles such that a thickness gradient of the volume of lens material is oriented to be substantially orthogonal to a target eyelid margin shape.

Methods are described herein. An example method may comprise determining one or more eyelid profiles associated with one or more eyelids. The example method may comprise determining, based on the one or more eyelid profiles, a target eyelid margin shape. The example method may comprise designing, based on at least the target eyelid margin shape, an ophthalmic lens comprising a first surface and a second surface disposed opposite the first surface and defining a volume of lens material therebetween. A thickness profile of the volume of lens material may be derived from the one or more eyelid profiles such that a thickness gradient of the volume of lens material is oriented to be substantially orthogonal to the target eyelid margin shape.

Methods are described herein. An example method may comprise determining one or more eyelid profiles associated with one or more eyelids. The example method may comprise determining, based on the one or more eyelid profiles, a target eyelid margin shape. The example method may comprise forming, based on at least the target eyelid margin shape, an ophthalmic lens comprising a first surface and a second surface disposed opposite the first surface and defining a volume of lens material therebetween. A thickness profile of the volume of lens material may be derived from the one or more eyelid profiles such that a thickness gradient of the volume of lens material is oriented to be substantially orthogonal to the target eyelid margin shape.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
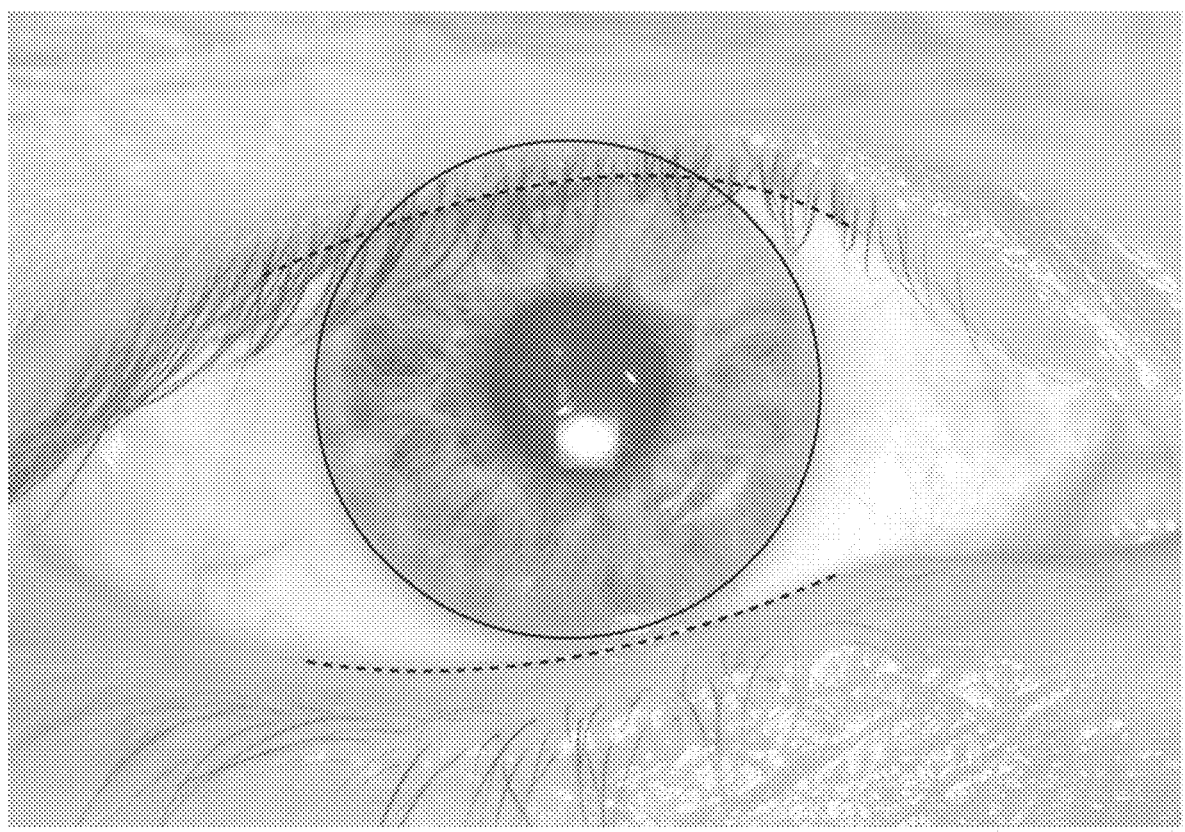
FIG. 1 shows an example of eye where the upper and lower eyelid margins have been manually delineated and fit by $2^{nd}$ order polynomials (dashed lines). The polynomials are defined with respect to the centroid of the ellipse defined by the solid line, where this ellipse is fit to points that were selected along the edge of the cornea.

Described herein are systems and methods for manufacturing a contact lens. A population may be selected. The population may comprise one or more of an ethnicity, an age range, a gender, the like, and/or any combination of the foregoing. A plurality of left eye or right eye images may be retrieved associated with the population. The plurality of images may be arranged such that a center of a cornea of an eye in each image may be in a same vertical and horizontal position relative to centers of corneas in other images. Additionally or alternatively, each image may be aligned with respect to the center of a contact lens placed on that eye (either the measured or expected lens decentration). For example, if using images over multiple gaze angles, the lens is likely to move i.e. change its centration slightly as the eye looks in different directions, so it may be better to have the alignment reference as the center of the lens rather than center of the cornea. The plurality of images may be used to extract eye shape data for the population. The extracted eye shape data may be used to design a contact lens for the population such that the contact lens comprises a stabilization area. The stabilization area may comprise a gradient of a thickness profile comprising right angles to an expected eyelid margin shape, wherein the expected eyelid margin shape is based on the extracted shape data.

Ophthalmic lenses are described herein. An example ophthalmic lens may comprise a first surface. The first surface may comprise a circular shape. The first surface may comprise a non-circular shape.

The example ophthalmic lens may comprise a second surface disposed opposite the first surface and defining a volume of lens material therebetween. The second surface may comprise a circular shape. The second surface may comprise a non-circular shape.

A thickness profile of the volume of lens material may be derived from one or more eyelid profiles such that a thickness gradient of the volume of lens material is oriented to be substantially orthogonal to a target eyelid margin shape. The one or more eyelid profiles may comprise biometric data associated with one or more of the position or shape of one or more of the upper or lower eyelid margins for a population of eyes. The population may comprise one or more of an ethnicity, an age range, and a gender. The one or more eyelid profiles may comprise biometric data associated with a population of eyes in a target position of gaze. The one or more eyelid profiles may comprise biometric data associated with a population of eyes in a plurality of positions of gaze.

The one or more eyelid profiles may comprise biometric data associated with a population of eyes in one or more stages of blink. The one or more eyelid profiles may comprise biometric data associated with one or more of the position or shape of one or more of the upper or lower eyelid margins for at least one eye. The one or more eyelid profiles may comprise biometric data associated with at least one eye in a target position of gaze. The one or more eyelid profiles may comprise biometric data associated with at least one eye in a plurality of positions of gaze.

The example ophthalmic lens may comprise a stabilization zone defined in or on the volume of material. The thickness profile may be associated with the stabilization zone.

The target eyelid margin shape may be determined with respect to a center of a cornea of at least one eye. The thickness profile may be based on a plurality of images. The thickness profile may be at least partially defined by a polynomial equation. The polynomial equation may be a second order polynomial equation. The thickness profile may be symmetrical about a central vertical axis and/or a central horizontal axis.

A contact lens manufacturer may receive a plurality of images. Each of the plurality of images may comprise a left eye of an Asian woman between the ages of twenty-four and fifty-four. The plurality of images may be arranged such that a center of a cornea of an eye in each image may be in a same vertical and horizontal position relative to centers of corneas in other images. The plurality of images may be used to extract eye shape data, such as eyelid margin data, for Asian women between the ages of twenty-four and fifty-four. The contact lens manufacturer may use the extracted eye shape data to design a contact lens for left eyes of Asian women between the ages of twenty-four and fifty-four. The designed contact lens may comprise a stabilization area. The stabilization area may comprise a gradient of a thickness profile comprising right angles to an expected eyelid margin shape, wherein the expected eyelid margin shape is based on the extracted shape data.

Methods are described herein. An example method may comprise determining one or more eyelid profiles associated with one or more eyelids. The one or more eyelid profiles may comprise biometric data associated with one or more of the position or shape of one or more of the upper or lower eyelid margins for a population of eyes. The population may comprise one or more of an ethnicity, an age range, and a gender. The one or more eyelid profiles may comprise biometric data associated with a population of eyes in a target position of gaze. The one or more eyelid profiles may comprise biometric data associated with a population of eyes in a plurality of positions of gaze.

The one or more eyelid profiles may comprise biometric data associated with a population of eyes in one or more stages of blink. The one or more eyelid profiles may comprise biometric data associated with one or more of the position or shape of one or more of the upper or lower eyelid margins for at least one eye. The one or more eyelid profiles may comprise biometric data associated with at least one eye in a target position of gaze. The one or more eyelid profiles may comprise biometric data associated with at least one eye in a plurality of positions of gaze.

The example method may comprise determining, based on the one or more eyelid profiles, a target eyelid margin shape. The target eyelid margin shape may be determined with respect to a center of a cornea of at least one eye.

The example method may comprise designing, based on at least the target eyelid margin shape, an ophthalmic lens comprising a first surface and a second surface disposed opposite the first surface and defining a volume of lens material therebetween. The ophthalmic lens may comprise a stabilization zone defined in or on the volume of material. One or more of the first surface and the second surface may comprise a circular shape. One or more of the first surface and the second surface may comprise a non-circular shape.

A thickness profile of the volume of lens material may be derived from the one or more eyelid profiles such that a thickness gradient of the volume of lens material is oriented to be substantially orthogonal to the target eyelid margin shape. The thickness profile may be associated with the stabilization zone. The thickness profile may be based on a plurality of images. The thickness profile may be at least partially defined by a polynomial equation. The polynomial equation may be a second order polynomial equation. The thickness profile may be symmetrical about a central vertical axis and/or a central horizontal axis.

A contact lens manufacturer may receive a plurality of images. Each of the plurality of images may comprise a right eye of an Asian woman between the ages of twenty-four and fifty-four. The plurality of images may be arranged such that a center of a cornea of an eye in each image may be in a same vertical and horizontal position relative to centers of corneas in other images. The plurality of images may be used to extract eye shape data, such as eyelid margin data, for Asian women between the ages of twenty-four and fifty-four. The contact lens manufacturer may use the extracted eye shape data to design a contact lens for right eyes of Asian women between the ages of twenty-four and fifty-four. The designed contact lens may comprise a stabilization area. The stabilization area may comprise a gradient of a thickness profile comprising right angles to an expected eyelid margin shape, wherein the expected eyelid margin shape is based on the extracted shape data.

Methods are described herein. An example method may comprise determining one or more eyelid profiles associated with one or more eyelids. The one or more eyelid profiles may comprise biometric data associated with one or more of the position or shape of one or more of the upper or lower eyelid margins for a population of eyes. The population may comprise one or more of an ethnicity, an age range, and a gender. The one or more eyelid profiles may comprise biometric data associated with a population of eyes in a target position of gaze. The one or more eyelid profiles may comprise biometric data associated with a population of eyes in a plurality of positions of gaze.

The one or more eyelid profiles may comprise biometric data associated with a population of eyes in one or more stages of blink. The one or more eyelid profiles may comprise biometric data associated with one or more of the position or shape of one or more of the upper or lower eyelid margins for at least one eye. The one or more eyelid profiles may comprise biometric data associated with at least one eye in a target position of gaze. The one or more eyelid profiles may comprise biometric data associated with at least one eye in a plurality of positions of gaze.

The example method may comprise determining, based on the one or more eyelid profiles, a target eyelid margin shape. The target eyelid margin shape may be determined with respect to a center of a cornea of at least one eye.

The example method may comprise forming, based on at least the target eyelid margin shape, an ophthalmic lens comprising a first surface and a second surface disposed opposite the first surface and defining a volume of lens material therebetween. The ophthalmic lens may comprise a stabilization zone defined in or on the volume of material. One or more of the first surface and the second surface may comprise a circular shape. One or more of the first surface and the second surface may comprise a non-circular shape.

A thickness profile of the volume of lens material may be derived from the one or more eyelid profiles such that a thickness gradient of the volume of lens material is oriented to be substantially orthogonal to the target eyelid margin shape. The thickness profile may be associated with the stabilization zone. The thickness profile may be based on a plurality of images. The thickness profile may be at least partially defined by a polynomial equation. The polynomial equation may be a second order polynomial equation. The thickness profile may be symmetrical about a central vertical axis and/or a central horizontal axis.

A contact lens manufacturer may receive an image of an eye. The image may be used to extract eye shape data, such as eyelid margin data, for the eye. The contact lens manufacturer may use the extracted eye shape data to design a contact lens for the eye. The designed contact lens may comprise a stabilization area. The stabilization area may comprise a gradient of a thickness profile comprising right angles to an expected eyelid margin shape, wherein the expected eyelid margin shape is based on the extracted shape data.

Disclosed herein is a toric lens stabilization design, where the thickness map is derived from the eyelid position from a population of eyes, such that the thickness gradient of the lens is oriented to be orthogonal to the 'average' eyelid margin shape.

Disclosed herein are systems and/or methods for improving toric lens rotational performance (greater stability over time and greater consistency in settled position over different eyes).

Described below is a novel method for designing or optimizing a design of a contact lens that is intended to be rotationally stabilized on the eye.

This method may be used for circular or non-circular contact lenses.

The design process may comprise obtaining biometric data on the position and shape of the upper and lower eyelid margins for a population of eyes. The position and shape of the upper and lower eyelid margins is analyzed with the eye in a natural position of gaze (i.e. primary position, looking straight ahead and not squinting nor opening the eyelids wide). The shape and position of the eyelid margins is determined in relation to either the position of the cornea, or the position of a contact lens worn on the eye. Image analysis software is used to delineate the upper and lower eyelid margins by selecting several points along the lid margins. The selected points may then be fit with a polynomial or similar function to mathematically describe the shape and position of the eyelid margins with respect to a predefined landmark (e.g., with respect to the center of the cornea). FIG. 1 shows an example of eye where the upper and lower eyelid margins have been manually delineated and fit by $2^{nd}$ order polynomials (dashed lines). The polynomials are defined with respect to the centroid of the ellipse defined by the solid line, where this ellipse is fit to points that were selected along the edge of the cornea.

Figure 2:
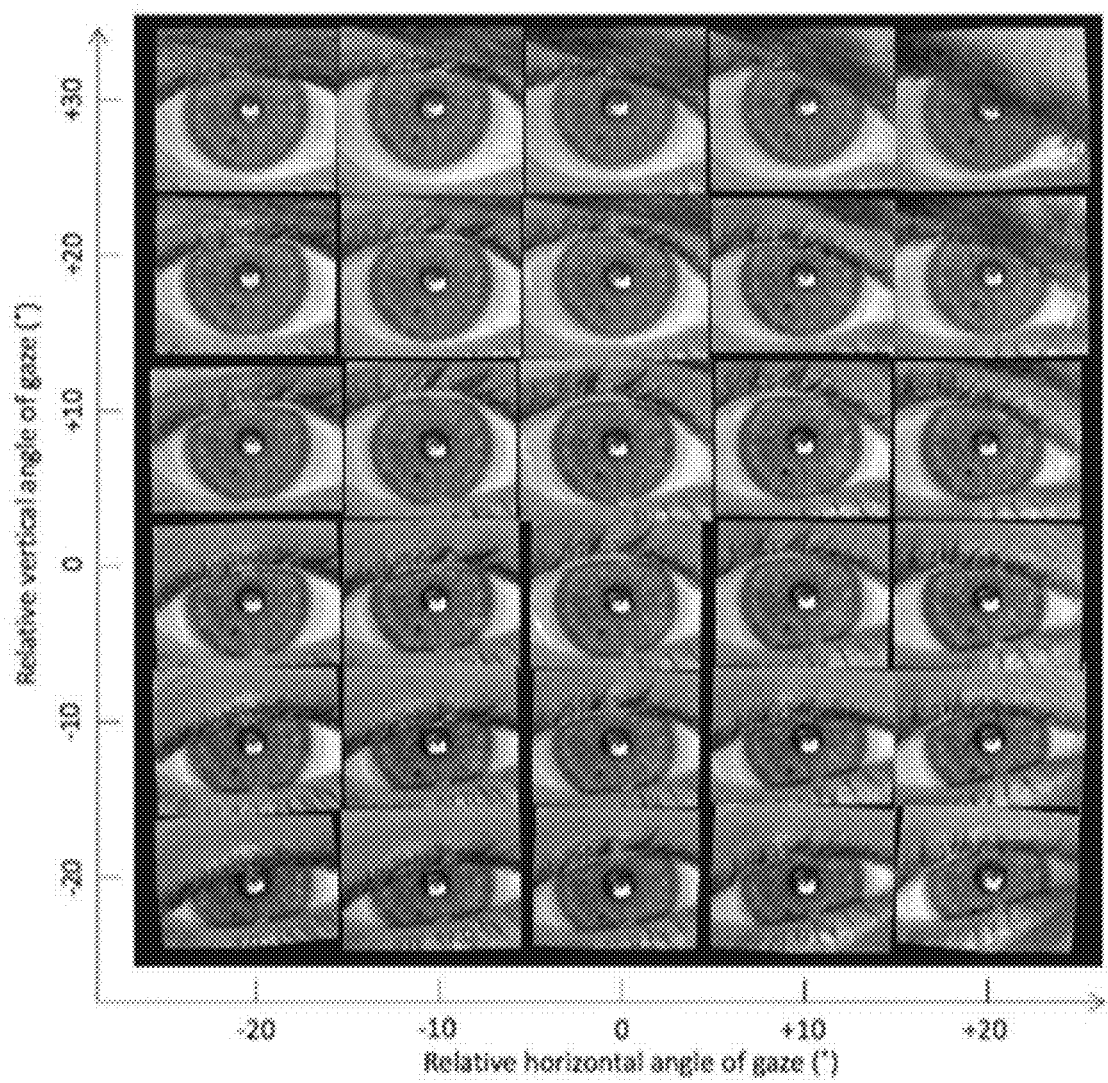
FIG. 2 illustrates a series of such images collected on an eye with the angle of gaze changing by 10° between adjacent images.

In addition to collecting this data in primary gaze (i.e., with the eye looking straight ahead), eyelid margin biometric data may also be collected with the eye looking in different degrees of peripheral gaze. For example, the position and shape of the eyelids (with respect to either the cornea, or a contact lens worn on the eye) may be collected with the eye rotated in certain horizontal, vertical or oblique directions, while maintaining a natural eyelid posture (i.e., not squinting or 'opening wide'). FIG. 2 illustrates a series of such images collected on an eye with the angle of gaze changing by 10° between adjacent images.

Such images may be collected for a single eye, or for a population of eyes. Such population of eyes may involve a representative population for a certain region, or a representative population of eyes for a certain ethnicity, age range, gender, or combination of these.

In addition to collecting images over multiple directions of gaze, multiple images may also be collected during different stages of a natural blink (for example, using high speed video recording).

Where images are collected over multiple directions of gaze, an averaging process may be applied to the eyelid shape data such that an 'average' eyelid margin shape (i.e. the average eyelid margin shape over multiple directions of gaze) is obtained. This averaging may involve averaging the polynomial coefficients over all images, or some other mathematical averaging technique. This averaging may involve weighting each of the images differently, for example a weighting function may be used whereby images where the eye is closer to primary gaze are weighted more heavily in the averaging function than images where the eye is looking in extreme peripheral gaze. Such a weighting function may be obtained from data showing a distribution of how much time the eye spends looking in different direction of gaze.

Similarly, when data is collected for a population of eyes, eyelid margin shape data may be averaged over multiple eyes. This may be done by averaging the polynomial coefficients or some other mathematical averaging technique. Averaging the shape data over multiple eyes may be done prior to, or after averaging the data over multiple directions of gaze as described above.

The stabilization design of the contact lens may then be derived from the eyelid margin shape data. This may be done by defining a thickness profile for the lens' stabilization areas, with the goal of creating the thickness profile such that the gradient of the thickness is normal to (i.e., orthogonal to) the averaged eyelid margin.

In other words, the thickness profile of the lens (when positioned in its nominal orientation on the eye) is defined in relation to the position and shape of the eyelid margins, such that the gradient (direction of greatest slope) of the thickness profile is at right angles to the averaged eyelid margin shape.

Instead of averaging eyelid shape data, or in conjunction with averaging, mathematical interpolation may be used to create a continuous lens thickness profile over a series of eyelid margin shapes.

Certain areas of the lens are excluded from the stabilization areas, including the central optic zone and peripheral lens edge. The design is blended with these areas through the use of blend zones.

Alternatively, a unique stabilized lens design may be created for each eye (or for each angle of gaze for a single eye), and the thicknesses of these designs may be averaged to create a final single stabilization design. A weighting function may be used during this averaging process, e.g. with greater weighting given to designs created from images where the eye is closer to primary gaze.

Instead of averaging data across multiple eyes, unique lens stabilization profiles may be created for each individual eye, whereby the shape of the stabilization areas may be customized to the shape and position of the eyelids over one or multiple directions of gaze for that eye.

Averaging may also be applied such that the final lens stabilization design possesses mirror symmetry about the central vertical or horizontal axes, or may have both vertical and horizontal symmetry. In these cases, the design may be determined by averaging the thickness profile at all points of symmetry.

Figure 3:
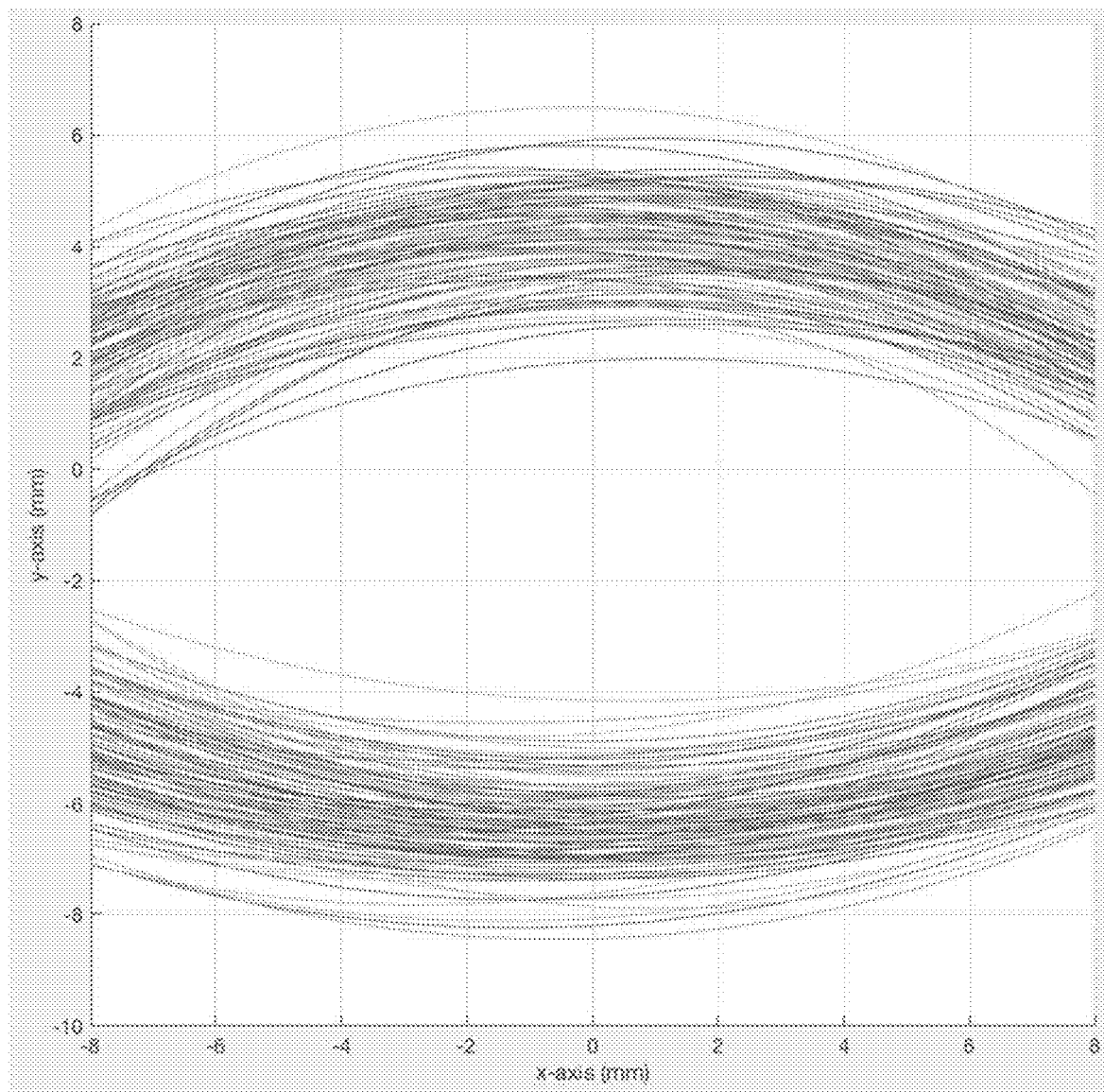
FIG. 3 shows eyelid shape data for the upper and lower eyelids of 102 right eyes, whereby each line is a 2nd order polynomial fit to a series of points that were delineated along the photographs of the eyelid margin with the eye in primary gaze.

Below is an example of one way data may be processed and averaged across multiple eyes in primary gaze to obtain a 'population averaged' design. For example, FIG. 3 shows eyelid shape data, whereby each line is a 2nd order polynomial fit to a series of points that were delineated along the photographs of the eyelid margin with the eye in primary gaze. Photographs were also taken of a millimeter scale such that the scaling of the images (millimeters per pixel) is known, and the position and shape of the eyelids is described in millimeters. The origin (0,0) is referenced to the center of the cornea. All of the eyes used in the collection of this data were right eyes (i.e., no left eyes were included in this particular dataset, however the design process is generalizable to the collection of left eye data).

Eyelid margin delineation and polynomial fitting was performed using custom-written image analysis software in MATLAB. The camera used to collect eyelid shape information is selected such that the images produced are a true representation of the eyelid shape in space. Image dewarping or correction of lens aberrations or geometric distortions (e.g., pincushion or barrel distortion) may be applied.

Figure 4:
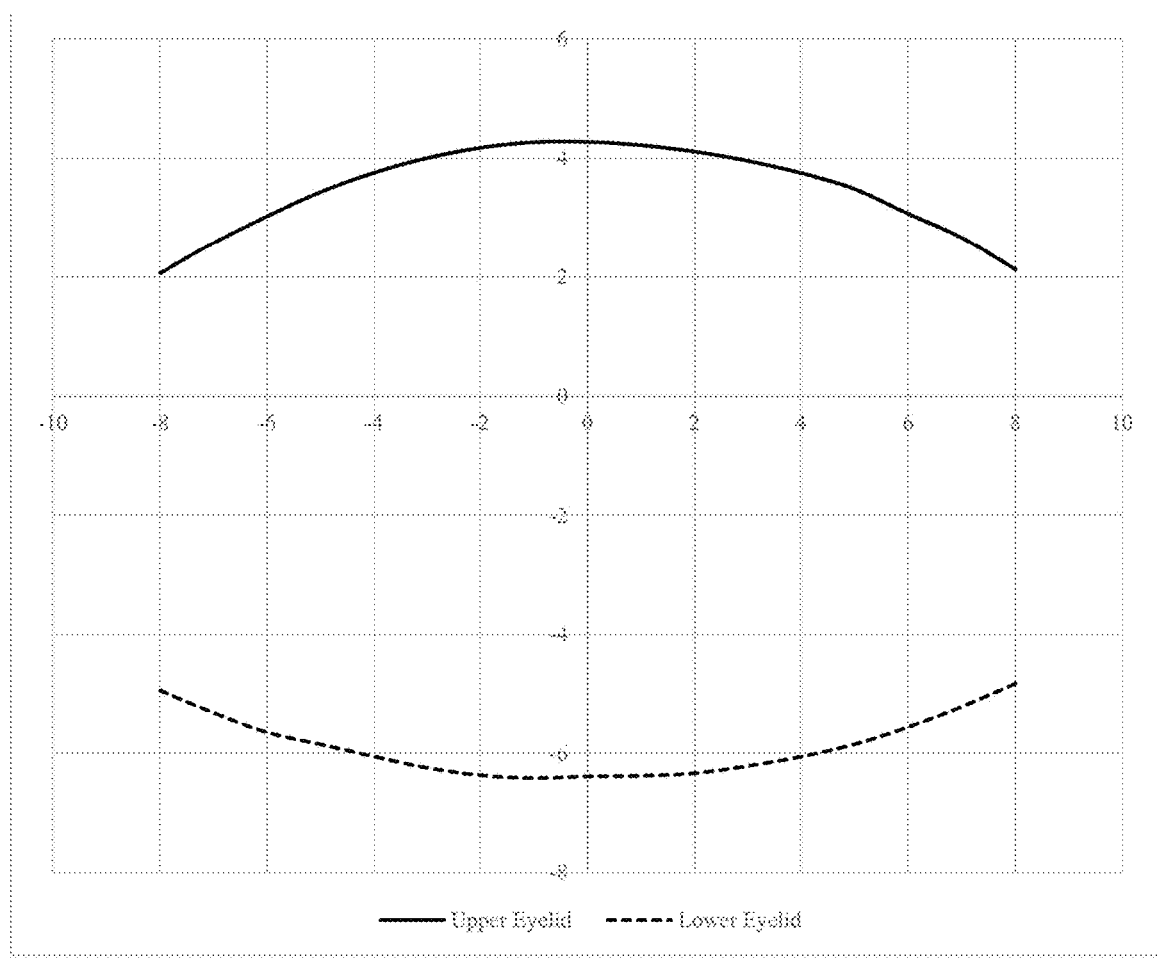
FIG. 4 illustrates a plot, separately for the upper and lower eyelids, showing an average eyelid margin shape was obtained by taking the median of all polynomials at each millimeter interval along the X-axis.

Separately for the upper and lower eyelids, an average eyelid margin shape was obtained by taking the median of all polynomials at each millimeter interval along the X-axis. FIG. 4 illustrates a plot, separately for the upper and lower eyelids, showing an average eyelid margin shape was obtained by taking the median of all polynomials at each millimeter interval along the X-axis. At each millimeter interval on the x-axis, the y-value was determined by taking the median of all y-values for the upper eyelid polynomials shown in FIG. 3. A similar process was followed for the lower eyelid.

So that the final lens design may be left-right symmetrical, the data was 'flipped' left-right about the y-axis. The 'flipped' and non-flipped data was then averaged together by taking the mean of the flipped and non-flipped y-values at each position. The resultant 'averaged' data is therefore symmetrical about the y-axis.

Figure 5:
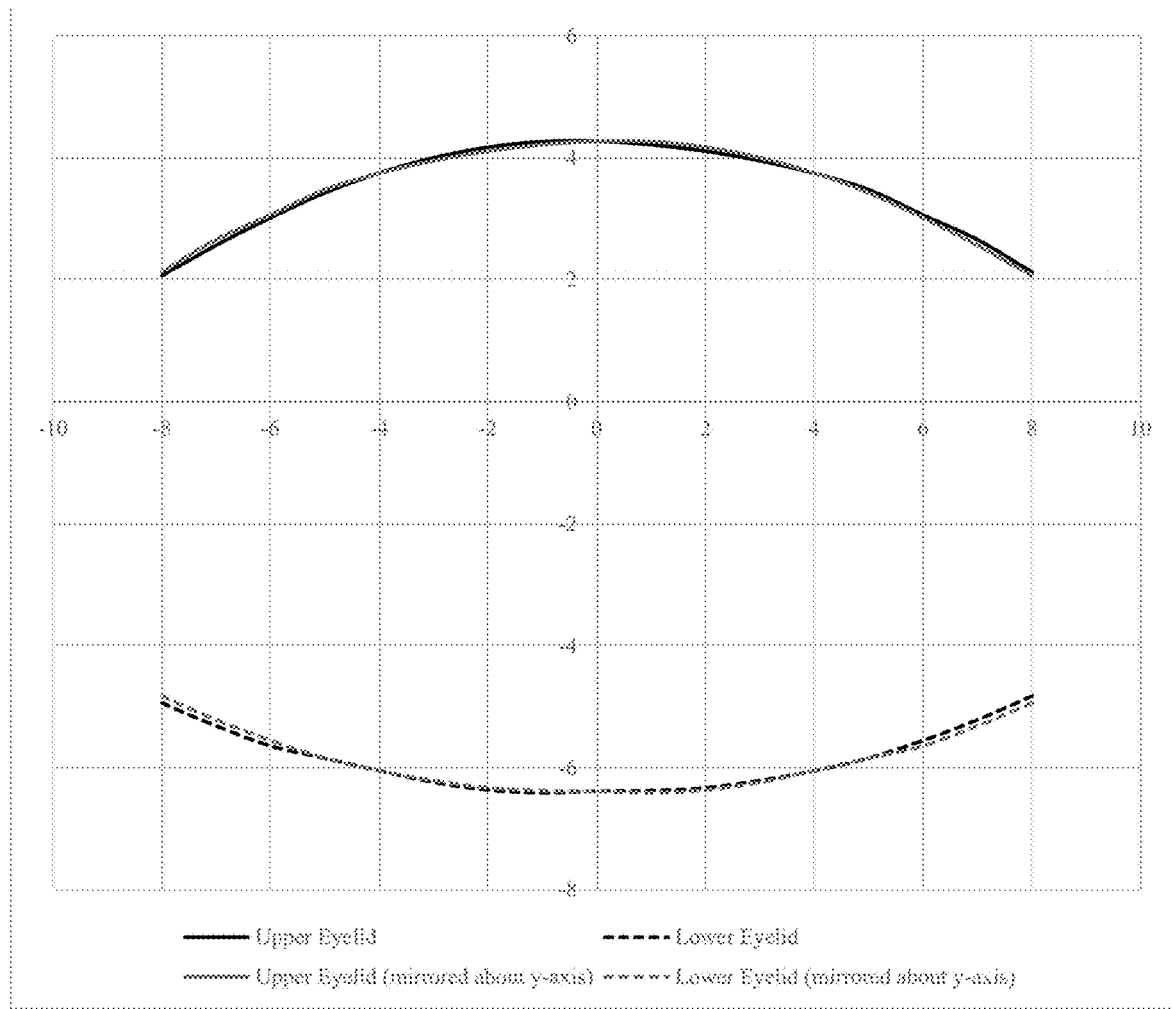
FIG. 5 shows the left-right 'flipped' and 'non-flipped' data plotted both together on the same axes.

FIG. 5 shows the left-right 'flipped' and 'non-flipped' data plotted both together on the same axes.

Figure 6:
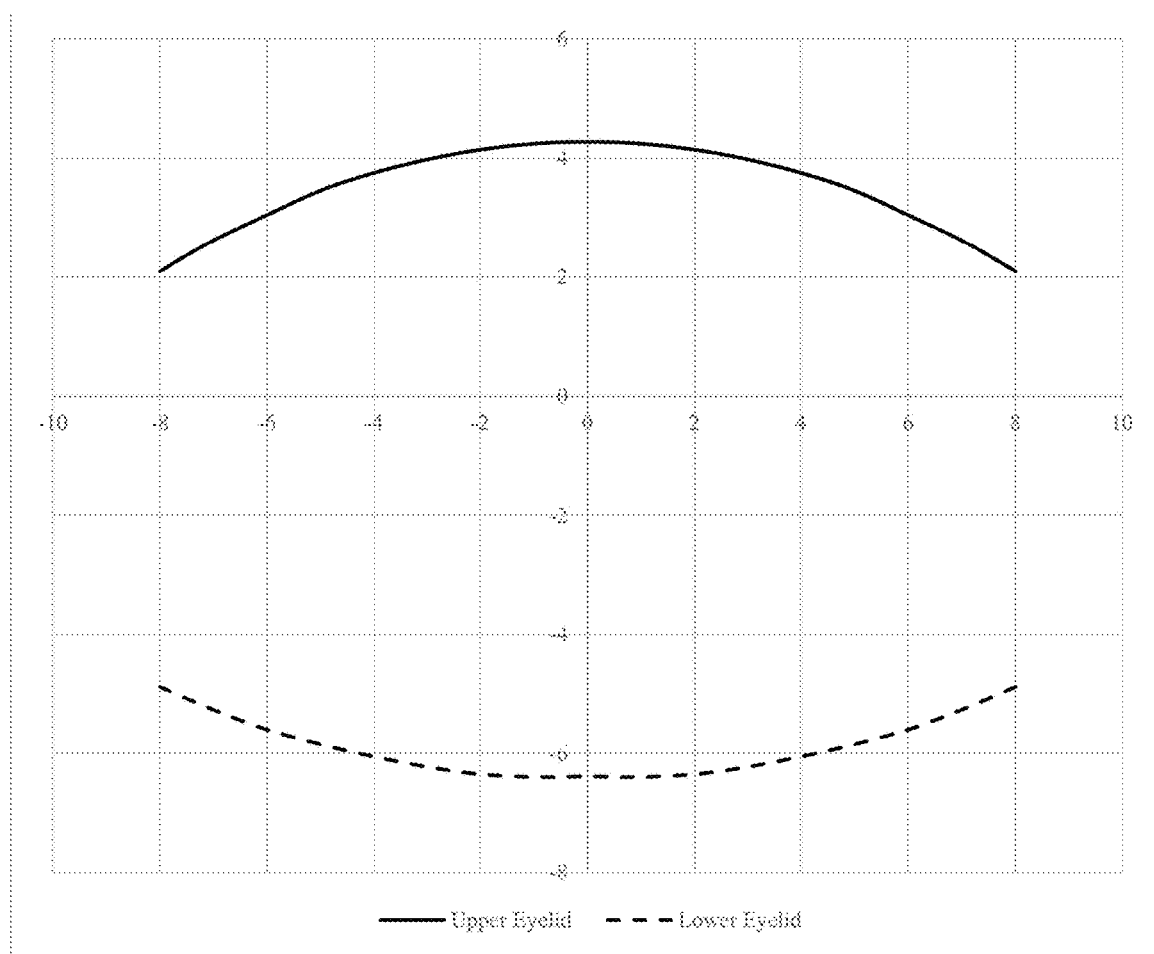
FIG. 6 shows the average of the flipped and non-flipped data, whereby the mean of the y-axis values for each was taken at each millimeter interval.
Figure 7:
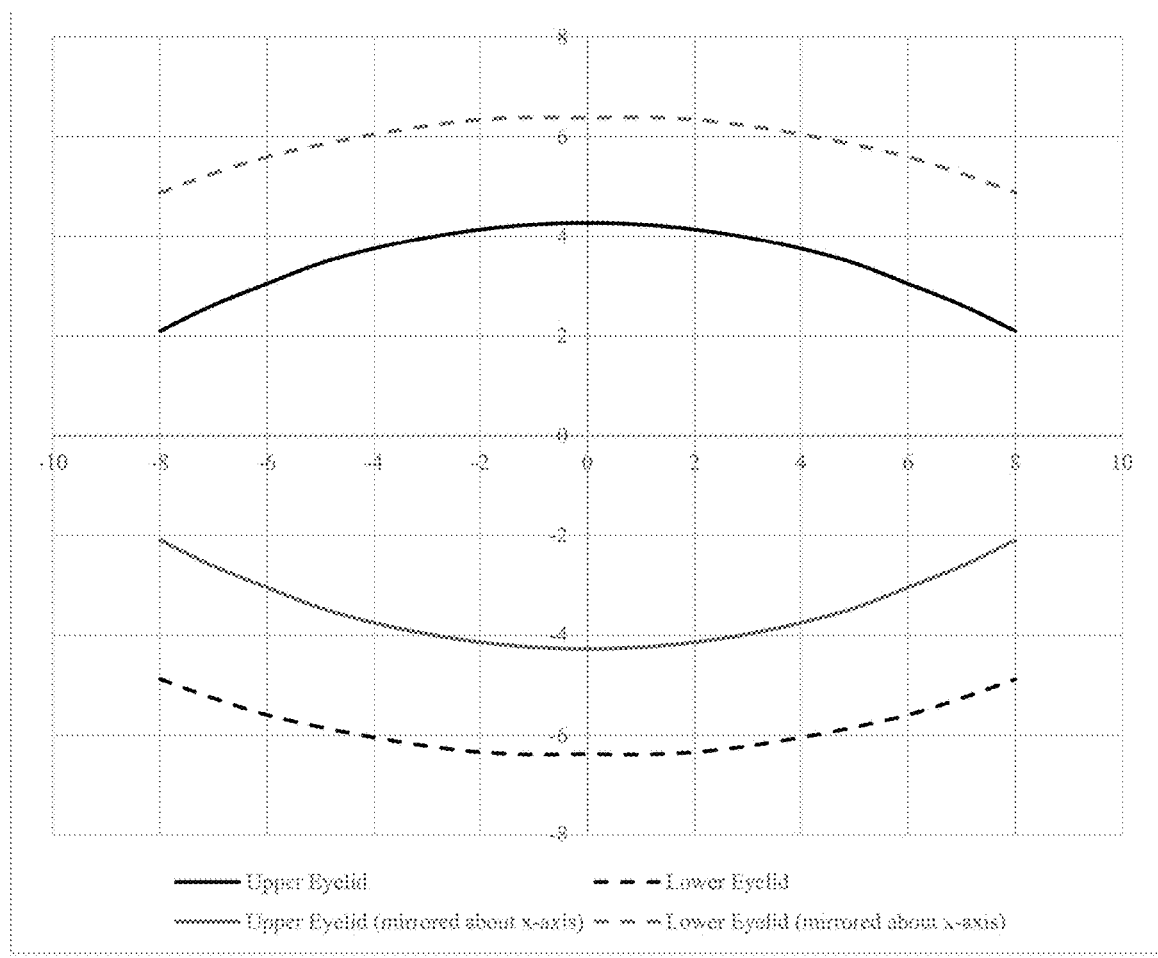
FIG. 7 shows the top-bottom 'flipped' and 'non-flipped' data plotted both together on the same axes.

FIG. 6 shows the average of the flipped and non-flipped data, whereby the mean of the y-axis values for each was taken at each millimeter interval. For example, to ensure the final design is top-bottom symmetrical about the x-axis, the data was again flipped, this time about the x-axis. FIG. 7 shows the top-bottom 'flipped' and 'non-flipped' data plotted both together on the same axes.

A lens thickness design was then generated as follows:
Points at millimeter intervals (from −8 mm to +8 mm on the x-axis, i.e. −8 mm, −7 mm, −6 mm. etc.) were selected along the lines shown in the figure above.
For the lines representing the average upper eyelid margin shape (both mirrored and unmirrored), these points were given a z-coordinate value of 1.
For example, the point coordinate values for the upper eyelid margin shapes are:
Point 1 (x, y, z)=(−8, [y value at x=−8], 1)
Point 2 (x, y, z)=(−7, [y value at x=−7], 1)
Point 3 (x, y, z)=(−6, [y value at x=−6], 1)
Etc. . . .
For the lines representing the average lower eyelid margin shape (both mirrored and unmirrored), these points were given a z-coordinate value of 0. For example, the point coordinate values for the lower eyelid margin shapes are:
Point 1 (x, y, z)=(−8, [y value at x=−8], 0)
Point 2 (x, y, z)=(−7, [y value at x=−7], 0)
Point 3 (x, y, z)=(−6, [y value at x=−6], 0)
Etc. . . .

Figure 8:
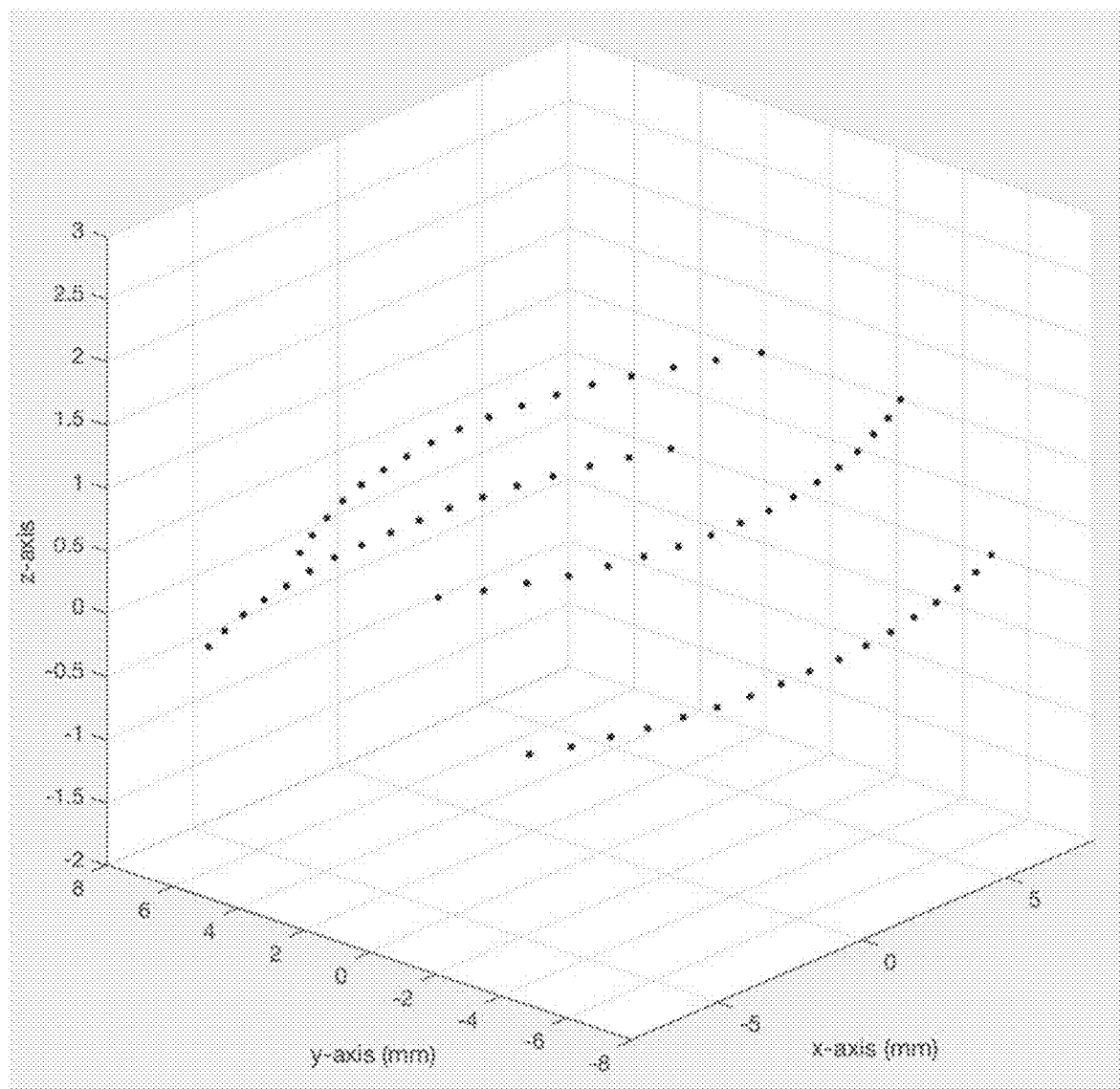
FIG. 8 shows the result as a 3-dimensional array of data points.

The result was a 3-dimensional array of data points, as shown in FIG. 8. Using the MATALB curve fitting tool, the data points were then fit with a 'best fit' polynomial surface with degree 2, defined by the function:

$$z = a + b*x^0 + x*y^2$$

Figure 9:
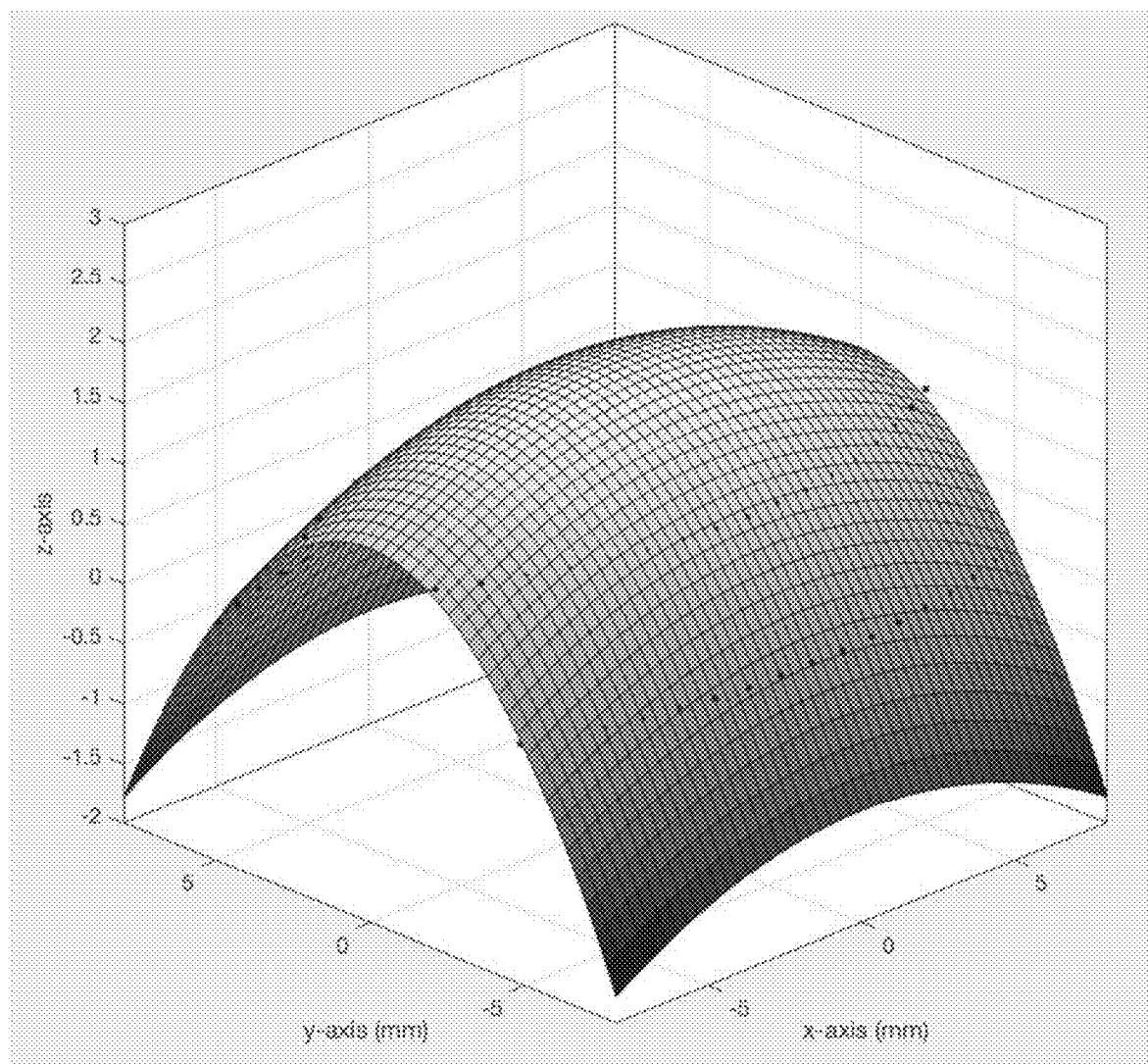
FIG. 9 shows the 'best fit' polynomial function to these data points using an equation of this form.

FIG. 9 shows the 'best fit' polynomial function to these data points using an equation of this form. The polynomial surface shape is fit to the data points using a least squares algorithm. The resultant values of coefficients a, b and c are thus determined.

Instead of using a second order polynomial as described here, a higher order polynomial or some other mathematical function that defines a surface shape could be used. This polynomial may then be used to represent the thickness profile for the stabilization area of a contact lens, where the local maximum of the polynomial (central high point at (x,y)=[0,0]) represents the thickest part of the lens.

Figure 10:
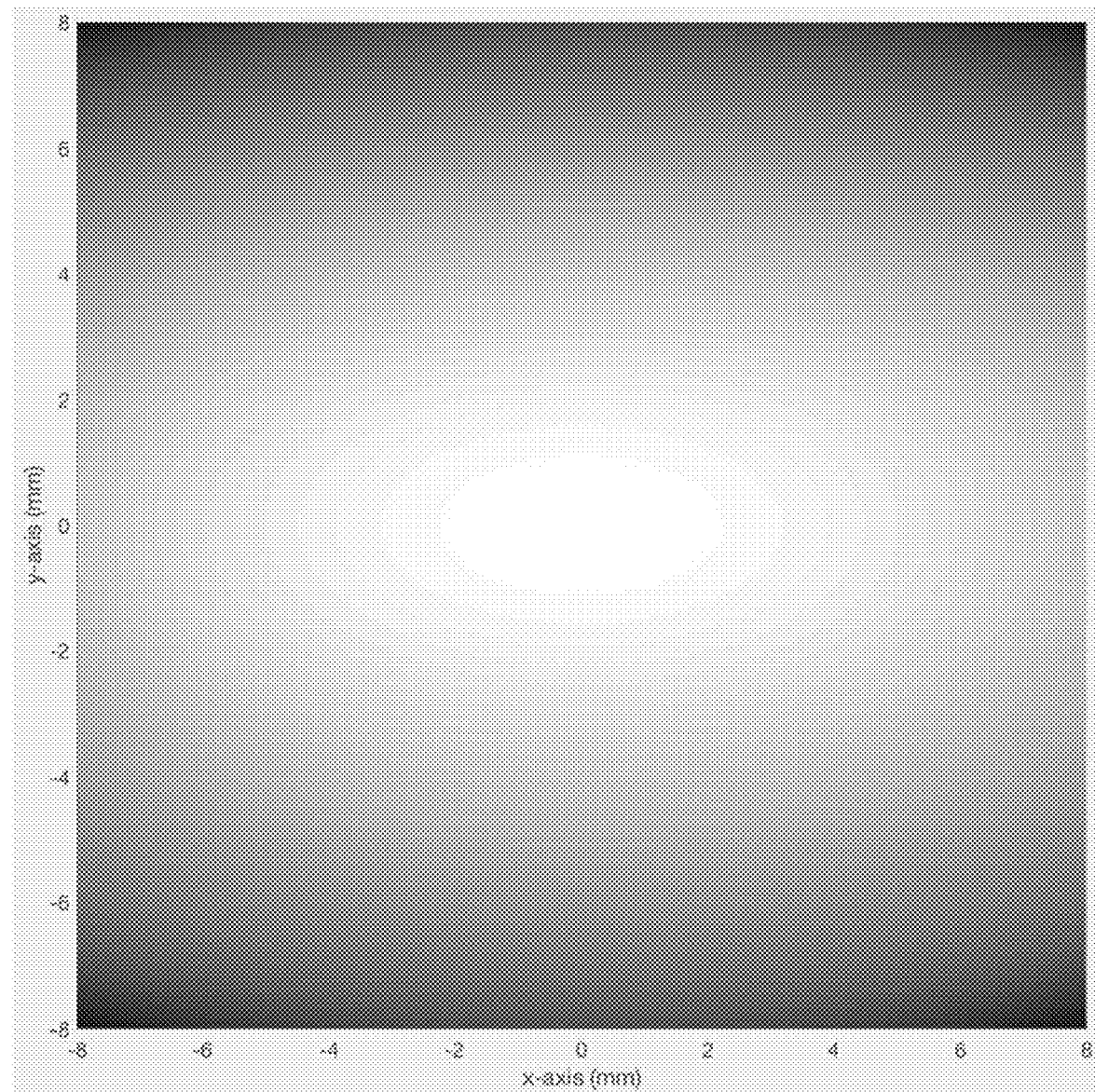
FIG. 10 shows a plot of an example polynomial where the shade represents the height (z-value) of the surface shape.

FIG. 10 shows another plot of this polynomial where the shade represents the height (z-value) of the surface shape. This 'thickness map' may then be used as a basis for creating a lens thickness profile in the stabilization areas of the design. The central optic zone of the lens would be excluded, as would the peripheral lens edge where the thickness of the lens is reduced to zero. The stabilization areas of the lens would be blended with these features in 'blend zone' areas to enable the design to be a continuous 3D surface.

Figure 11:
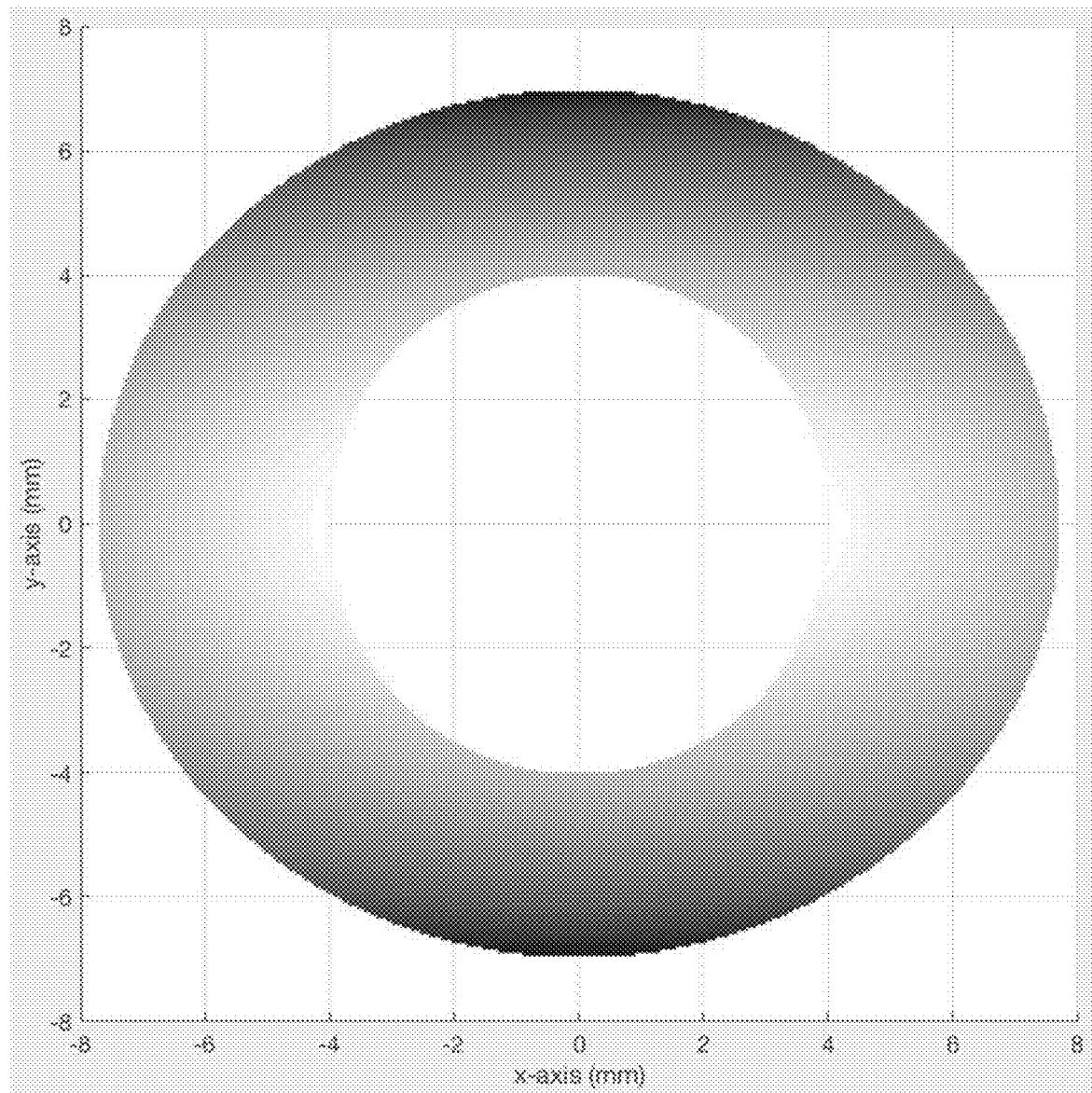
FIG. 11 shows a thickness profile with areas for the optic zone and lens edge cut-out.

FIG. 11 shows the thickness profile with areas for the optic zone and lens edge crudely cut-out. The optic zone was 'cut out' by removing data from a central 8 mm circle. The lens edge and beyond was crudely 'cut out' by removing any data that fell outside of an ellipse with dimeter 15.5 mm horizontally, and 14.0 mm vertically.

An example ophthalmic lens may comprise a first surface and a second surface disposed opposite the first surface and defining a volume of lens material therebetween. A thickness profile of the volume of lens material may be derived from one or more eyelid profiles such that a thickness gradient of at least a portion of the volume of lens material is oriented to be orthogonal to a target eyelid margin shape. The one or more eyelid profiles may comprise biometric data associated with one or more of the position or shape of one or more of the upper or lower eyelid margins for a population of eyes. The one or more eyelid profiles may comprise biometric data associated with a population of eyes in a target position of gaze. The one or more eyelid profiles may comprise biometric data associated with a population of eyes in a plurality of positions of gaze. The one or more eyelid profiles may comprise biometric data associated with a population of eyes in one or more stages of blink. The one or more eyelid profiles may comprise biometric data associated with one or more of the position or shape of one or more of the upper or lower eyelid margins for at least one eye. The one or more eyelid profiles may comprise biometric data associated with at least one eye in a target position of gaze. The one or more eyelid profiles may comprise biometric data associated with at least one eye in a plurality of positions of gaze. The thickness profile may associated with a stabilization zone. The portion of the volume of lens material may comprises an annulus volume disposed between an edge of the ophthalmic lens and an optical zone radius. The optical zone radius may be between 3 and 5 mm from the center of the ophthalmic lens. The portion of the volume of lens material may comprise an annulus volume comprising a radial region that excludes an area between a terminal edge of the ophthalmic lens and a radius between 1-300 microns from the terminal edge of the ophthalmic lens.

Figure 12:
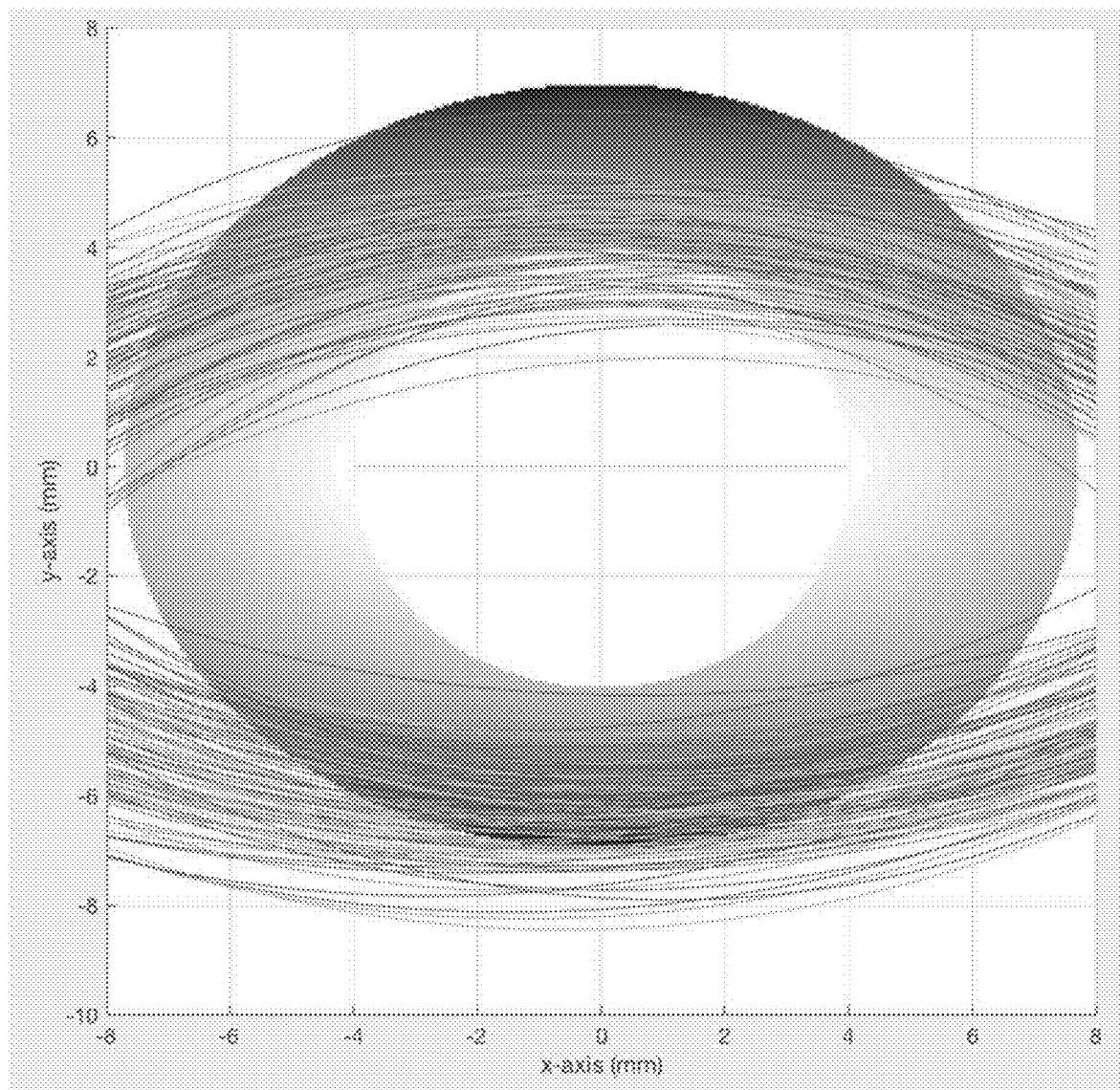
FIG. 12 shows a plot of an example design image overlaid with the original lid shape polynomials, where the eyelid shapes have been centered over the origin.

To visualize the shape of this design in relation to the original eyelid margin data, FIG. 12 shows a plot of the final design image overlaid with the original lid shape polynomials.

As stated above, this is one example of how eyelid shape data may be used to create a lens design. A better technique could be developed through discussion with someone with a high level of expertise in mathematics, topology, data analysis and 3D modelling.

Instead of the example described, a more optimal method of design might involve one or more of the following:
  Polynomial functions with of higher degrees, or other mathematical functions to fit the eyelid shape data.
  Referencing the eyelid shape functions to the center of a contact lens worn on eye (i.e. such that the origin of the axes is at the center of the contact lens) rather than the center of the cornea.
  Different techniques for combining eyelid shape data from different images, whereby they may be combined by taking a mean or median of the function coefficients, average of the function value over certain areas, or averaging a 'slope/gradient' functions of surface shapes generated from the eyelid shape data.

The techniques described above could also be used to create a customized stabilization design for an individual eye, rather than a design that is 'averaged' across multiple eyes.

Figure 13:
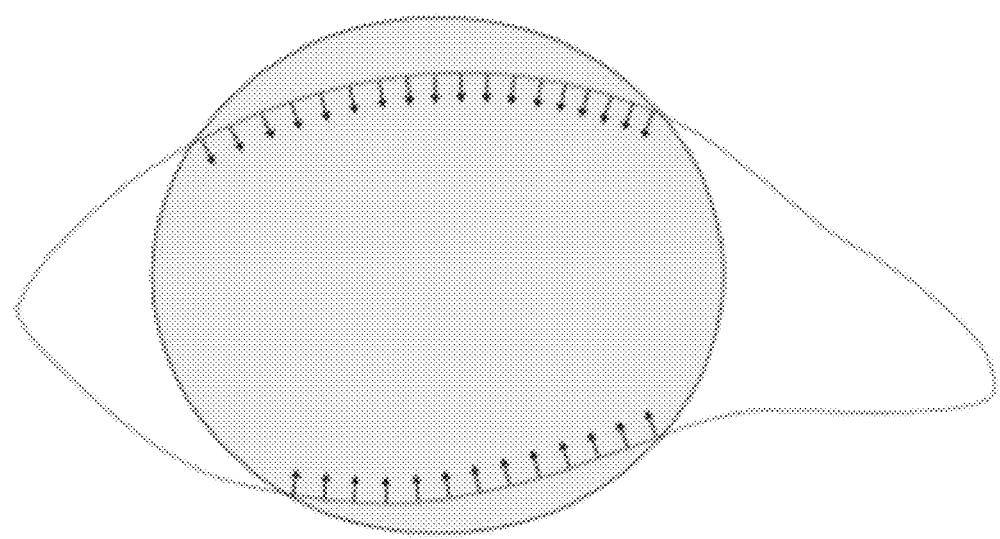
FIG. 13 shows a model eye where arrows illustrate orthogonal vectors relative to the eye lids.

As an example, an ophthalmic lens may comprise a first surface and a second surface disposed opposite the first surface and defining a volume of lens material therebetween. A thickness profile of the volume of lens material is derived from one or more eyelid profiles such that a thickness gradient of the volume of lens material is oriented to be substantially orthogonal to a target eyelid margin shape, as illustrated in FIG. 13. Substantially orthogonal may comprise orthogonal angles and angles that are +/−20 degrees from orthogonal.

As a further example, a method for creating a tonic lens stabilization design may comprise determining eyelid margin shapes for a population of right eyes (OD). The upper and lower eyelid margin shapes may be plotted using a Cartesian coordinate system in two dimensions. For each eyelid, the 'average' (median) lid margin position at each plotted X position may be determined. The lid shapes may be mirrored about the y-axis (i.e., flipped left-right), to make them left-right symmetrical, so that the data is representative of an average of right (OD) and left (OS) eyes. The mirrored and non-mirrored data may be plotted together. For each eyelid, an average (mean or median) of the non-mirrored and mirrored data may be determined. The updated data may be centered over the origin, then mirrored about the X axis (i.e. flipped up-down—so that the final design may be 'bidirectional') and both sets of data may be plotted together. A thickness map function may be generated by treating these lines as equal-thickness contour lines. The gradient of a function at any point along the contour line is perpendicular to that line. The lens thickness at data points along each line may be adjusted have the same Z value (height) in a three dimensional Cartesian coordinate system, so that they are effectively treated as points along contour lines. A data point may be added at $(x,y)=(0,0)$ with height (Z value) greater than the Z value assigned to the contour lines. A best-fit $2^{nd}$ degree polynomial in x and y may then be determined. Data within a central 8 mm diameter (area of the contact lens optic zone), and any data outside of an ellipse with 15.5 mm horizontal diameter, 14 mm vertical diameter (outside of the 'edges' for an elliptical lens with these horizontal and vertical diameters) may be filtered out. To demonstrate the design in relation to the original data, the image may be plotted with the original lid shapes over-laid with transparency.

What is claimed is:

1. An contact lens comprising:
  a first surface;
  a second surface disposed opposite the first surface and defining a volume of lens material therebetween having a varying thickness;
  said first and second surfaces being joined at a common round peripheral lens edge; and
  an optic zone positioned within the peripheral lens edge;
  wherein a maximum thickness profile of the lens which defines the thickest points across the lens substantially matches a target upper eyelid margin shape derived from data from one or more images of one or more eyelid profiles that is fitted to a curve using a predetermined best fit polynomial, and wherein a thickness gradient being a direction of greatest slope of said maximum thickness profile along its length is structured such that it is oriented to be orthogonal to the target upper eyelid margin shape; and
  wherein the maximum thickness profile extends continuously across the contact lens other than in said optic zone and at said peripheral lens edge.

2. The ophthalmic lens of claim 1, wherein the data from the one or more eyelid profiles comprise biometric data associated with one or more of the position or shape of one or more of upper or lower eyelid margins for a population of eyes.

3. The ophthalmic lens of claim 1, wherein the data from the one or more eyelid profiles comprise biometric data associated with a population of eyes in a target position of gaze.

4. The ophthalmic lens of claim 1, wherein the data from the one or more eyelid profiles comprise biometric data associated with a population of eyes in a plurality of positions of gaze.

5. The ophthalmic lens of claim 1, wherein the data from the one or more eyelid profiles comprise biometric data associated with a population of eyes in one or more stages of blink.

6. The ophthalmic lens of claim 1, wherein the data from the one or more eyelid profiles comprise biometric data associated with one or more of the position or shape of one or more of upper or lower eyelid margins for at least one eye.

7. The ophthalmic lens of claim 1, wherein the data from the one or more eyelid profiles comprise biometric data associated with at least one eye in a target position of gaze.

8. The ophthalmic lens of claim 1, wherein the data from the one or more eyelid profiles comprise biometric data associated with at least one eye in a plurality of positions of gaze.

9. The ophthalmic lens of claim 1, wherein the portion of the volume of lens material comprises an annulus volume disposed between an edge of the ophthalmic lens and an optical zone radius.

10. The ophthalmic lens of claim 9, wherein the optical zone radius is between 3 and 5 mm from the center of the ophthalmic lens.

11. The ophthalmic lens of claim 1, wherein the portion of the volume of lens material comprises an annulus volume excluding a radial region between an edge of the ophthalmic lens and a radius between 1-300 microns from the edge of the ophthalmic lens.

12. A method for designing a contact lens comprising:
obtaining data from one or more images of one or more eyelid profiles associated with one or more eyelids;
determining a target upper eyelid margin shape by fitting said data to a curve using a predetermined best fit polynomial;
designing a contact lens comprising a first surface and a second surface disposed opposite the first surface and defining a volume of lens material therebetween having a varying thickness, and a round peripheral lens edge, wherein a maximum thickness profile of said lens which defines the thickest points across the lens substantially matches said target upper eyelid margin shape and extends across said lens other than in said optic zone and at said peripheral lens edge, and wherein a thickness gradient being a direction of greatest slope of said maximum thickness profile along its length is structured such that it is oriented to be orthogonal to the target upper eyelid margin shape.

13. The method of claim 12, wherein the data from the one or more eyelid profiles comprise biometric data associated with one or more of the position or shape of one or more of upper or lower eyelid margins for a population of eyes.

14. The method of claim 12, wherein the data from the one or more eyelid profiles comprise biometric data associated with a population of eyes in a target position of gaze.

15. The method of claim 12, wherein the data from the one or more eyelid profiles comprise biometric data associated with a population of eyes in a plurality of positions of gaze.

16. The method of claim 12, wherein the data from the one or more eyelid profiles comprise biometric data associated with a population of eyes in one or more stages of blink.

17. The method of claim 12, wherein the data from the one or more eyelid profiles comprise biometric data associated with one or more of the position or shape of one or more of upper or lower eyelid margins for at least one eye.

18. The method of claim 12, wherein the data from the one or more eyelid profiles comprise biometric data associated with at least one eye in a target position of gaze.

19. The method of claim 12, wherein the data from the one or more eyelid profiles comprise biometric data associated with at least one eye in a plurality of positions of gaze.

20. The method of claim 12, further comprising a stabilization zone defined in or on the volume of material, wherein the thickness profile is associated with the stabilization zone.

21. The method of claim 12, wherein the portion of the volume of lens material comprises an annulus volume disposed between an edge of the ophthalmic lens and an optical zone radius.

22. The method of claim 21, wherein the optical zone radius is between 3 and 5 mm from the center of the ophthalmic lens.

23. The method of claim 12, wherein the portion of the volume of lens material comprises an annulus volume excluding a radial region between an edge of the ophthalmic lens and a radius between 1-300 microns from the edge of the ophthalmic lens.

* * * * *